(12) United States Patent
Lin et al.

(10) Patent No.: US 7,342,683 B2
(45) Date of Patent: Mar. 11, 2008

(54) DATA PROCESSING METHOD FOR COLOR MANAGEMENT MODULE

(75) Inventors: Fu-Chang Lin, Taipei (TW); Fu-Chin Wen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 953 days.

(21) Appl. No.: 10/464,505

(22) Filed: Jun. 19, 2003

(65) Prior Publication Data

US 2004/0257594 A1  Dec. 23, 2004

(51) Int. Cl.
*H04N 1/40* (2006.01)
(52) U.S. Cl. ................ 358/1.9; 358/1.18; 358/534
(58) Field of Classification Search ...... 358/1.15–1.18, 358/1.9, 2.1, 518–520, 534–536, 504
See application file for complete search history.

(56) References Cited

U.S. PATENT DOCUMENTS 5,727,137 A * 3/1998 LeClair et al. ............. 358/1.17

* cited by examiner

*Primary Examiner*—Thomas D. Lee
*Assistant Examiner*—Stephen Brinich
(74) *Attorney, Agent, or Firm*—Harness, Dickey & Pierce, P.L.C.

(57) ABSTRACT

A data processing method for a color management module (CMM), applying to image processing, including dividing an object data respectively into a meta file data, a CMM profile data and a screening/half-toning table. The meta file data is processed by a firmware of a printer, while the CMM profile data and the screening/half-toning table are processed by an application specification integrated circuit in the printer, thereby shortening the total time of data processing and thus improving the printing speed.

5 Claims, 4 Drawing Sheets

DATA PROCESSING METHOD FOR COLOR MANAGEMENT MODULE

BACKGROUND OF THE INVENTION

1. Field of Invention

The present invention relates to a data processing method performed with a color management module, suitable for image processing.

2. Related Art

Each computer peripheral appliance such as a scanner, a monitor, and a printer has its own color range. Usually, a picture that is laid out may have significant color differences through different peripherals. For example, the color of an image layout by printer may be slightly different from that is displayed on the monitor.

In order to solve the problem of output color difference of an image between different peripheral appliances, a color management module (CMM) is provided to equalize the color of the image layout provided by every peripheral.

In the CMM, a color management organization is installed in an operation system that includes a system configuration file defining the image capture and the color layout. The operation system usually has at least two configuration files. The CMM used for one peripheral may be different from the CMM used for other peripherals. Therefore, each peripheral requires its corresponding CMM independently.

Generally, objects to be processed in the computer are divided into three categories: text objects, graphic objects and image objects.

When the image objects are processed by the CMM, each pixel should be related to its corresponding color gamut, which causes a slow processing speed. For the text objects and the graphic objects, the colors of the text and graphic objects directly correspond to their corresponding color gamut's, and adjust the conversion of the whole memory block, thereby increasing the processing speed.

Although accessing-time of the memory for processing the text objects and the graphic objects is greatly reduced, this is not significant with respect to the total processing time, including the processing of the image objects. Especially when the whole page consists of image objects or when every object needs to undergo a raster operation.

An image display on a computer display device is achieved through RGB (red, blue and green) which are the main colors of a display color mode, while an image layout by printer or other peripherals is achieved through CMYK (cyan, magenta, yellow and black), which are the mains colors of the layout color mode.

Referring to FIG. 1, when the data or image shown on the computer display are to be laid out or printed, they are transmitted to an image-processing module 10 and are processed through a color management module 11, a half-toning/screening 12 and a compression 13. The data are transformed into the CMYK color mode and compressed for printing or scanning.

Half-toning processing is a process of conveying an image with a plurality of color-sublevels. In this process, the image is divided into a plurality of color spots, and indicated with a different density of color spots. For example, the light portion of color is displayed with a low density of color spots, while the more intense color portion is conveyed with a high density of color spots. Through a difference diffusion and screening, an image is generated with a half tone. The screening enables representing a color or gray graphic through re-organization of the spots.

However, when the printer processes the printing data, regardless of the computer site or the printer site, the image processing is proceeded at a limited speed because the CMM, the half-toning, the screening, and the compression are all performed at a specific site, for example, at the computer site or the printer site.

Furthermore, the data processing requires a lot of memory and processing capacity, which easily slows down the printing speed.

SUMMARY OF THE INVENTION

In order to solve the problem above, the invention provides a data processing method for a CMM, in which the CMM and screening processes of the image data processing method are performed by a specific application integrated circuit. A controller board directly transmits the data generated from the software for the firmware. The firmware of the controller board directly performs data decompression and renders to save the time of data processing, thereby increasing the printing speed.

The specific application integrated circuit is a logic circuit that has a particular specification for each particular purpose and can be designed according to the customer's demands. For example, the specific application integrated circuit is a programmable logic device (PLD) or a gate array circuit device. The specific application integrated circuit can be used in a wireless communication device or a portable PDA incorporating GPS and Bluetooth.

The invention distributes the tasks of CMM execution and screening in the image data processing to the specific application integrated circuit, to share the total processing load of the printing data, which increases the printing speed.

The data processing with the CMM according to the invention provides the following advantages.

The tasks of CMM execution and screening in the image data processing are assigned to the specific application integrated circuit to share the processing load of the printing data. Therefore, the printing speed can be increased without the need of a powerful CPU and an enlarged memory. The resolution of the layout can be further increased. Any type of document can be layout with an increased printing speed. A driver and a firmware of the data process, according to the invention, are easily constructed, and are compatible with any type of printer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus are not limitative of the present invention.

DETAILED DESCRIPTION OF THE INVENTION

Figure 1:
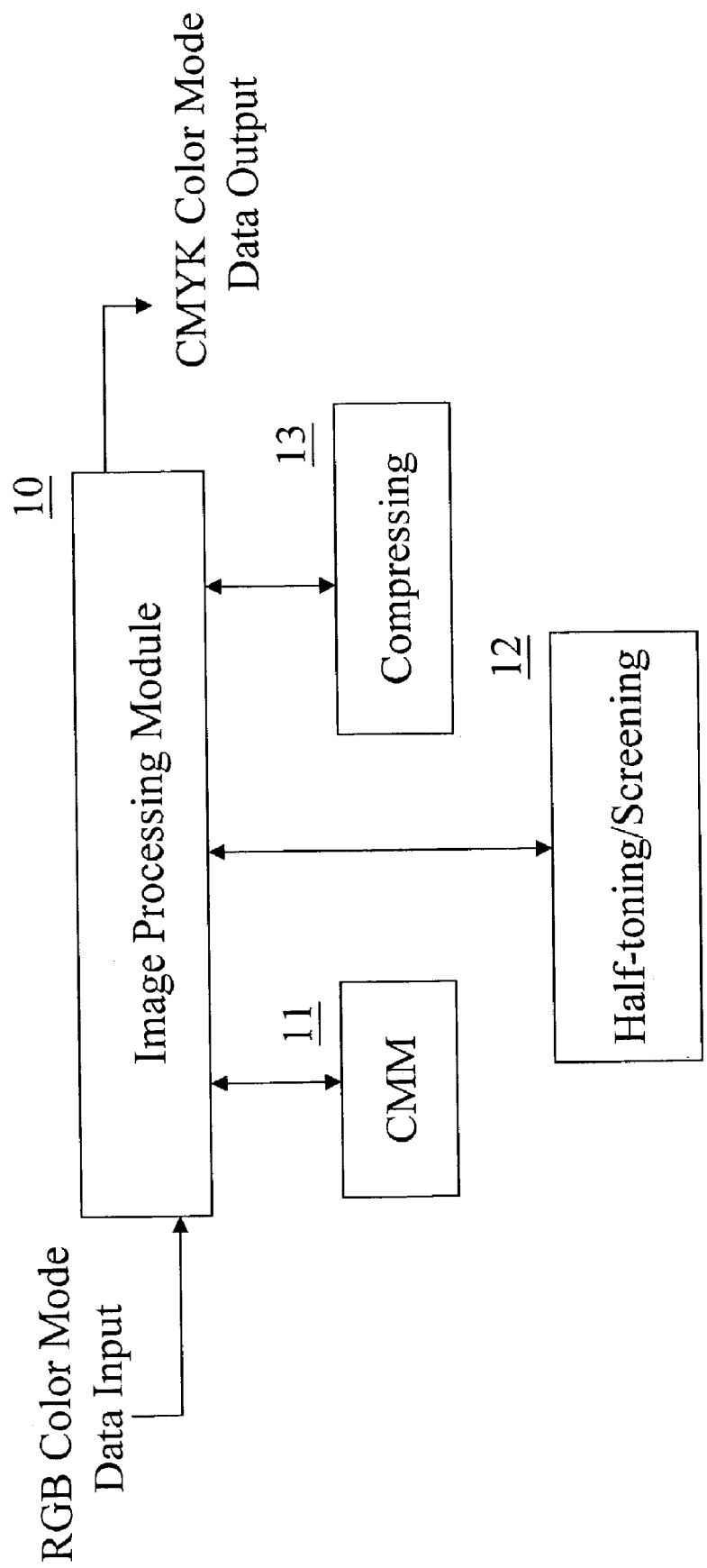
FIG. 1 is a flow chart of a conventional image processing.
Figure 2:
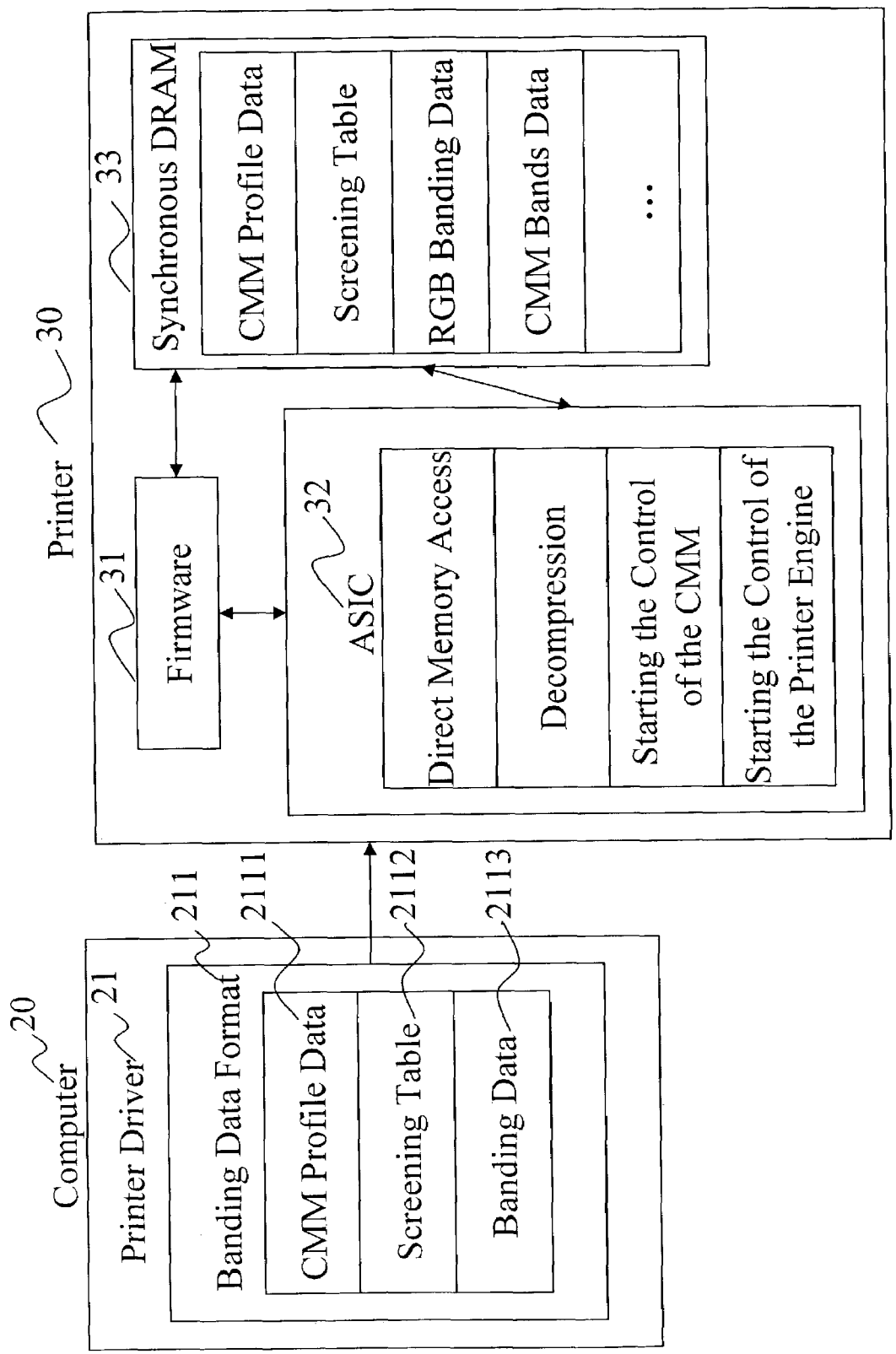
FIG. 2 shows an execution configuration of data processing performed with a CMM, according to the embodiment of the invention.

Referring to FIG. 2, a data processing with CMM is conducted between a computer 20 and a printer 30.

When the computer 20 requests the printer 30 to print, printing data are transmitted from the computer 20 to the printer 30. The printing data are subjected to a plurality of processing steps, including accessing and decompressing steps. These processing steps are achieved through firmware 31, an application specific integrated circuit 32 and a synchronous DRAM 33, to layout the printing data.

The computer 20 further includes a printer driver 21. Different printer drivers for separate printer-types provide their corresponding banding data format 211 to provide optimal printing performance.

A printer driver 211 usually includes a CMM profile 2111, a screening table 2112 and banding data 2113. Different printers 30 may have a different banding data format, for example, the GDI Job Header, the Page Header, Compressed RGB Banding Data, the Job End, PJL Command Setting, PJL CMM Profile Data Download, PCL & GL2 Command Data.

When the banding data are transferred to the printer 30 from the computer 20, the firmware 31 of the printer 30 assigns the transmission and processing of the banding data to the application specific integrated circuit 32 and the synchronous DRAM 33.

Tasks performed by he specific application integrated circuit 32 include: 1) direct memory access: when the computer 20 transmits the banding data 211, such as the CMM profile data 2111 or the screening table 2112 to the printer 30, the banding data are first transmitted to a fixed address; 2) decompression: a decompression module in the application specific integrated circuit 32 is used to decompress the banding data; 3) starting the control of the CMM: the CMM profile data are stored at a fixed address and are managed by the firmware 31; and 4) starting the control of the printer engine: the printer engine is controlled and any related information is reported.

The synchronous DRAM 33 stores the CMM profile data 2111 and the screening table 2112 for the specific application integrated circuit 32, to execute the CMM and screening operations. Thereby, the data processing is speeded up. The synchronous DRAM 33 also arranges locations for storing the data transmitted from the computer 20 to the printer 30.

Figure 3:
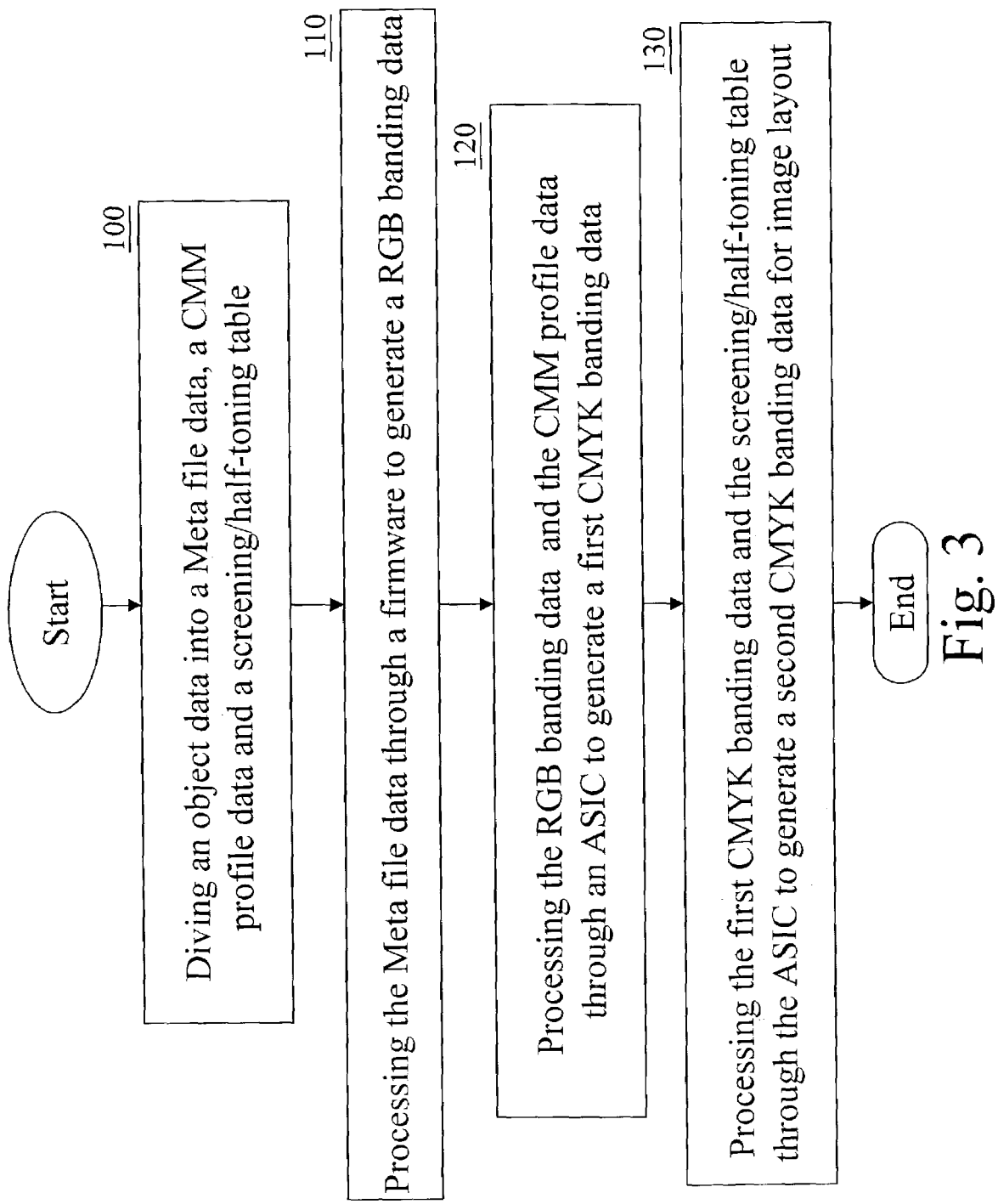
FIG. 3 is a flow chart illustrating the execution of data processing performed with a CMM, according to the embodiment of the invention.
Figure 4:
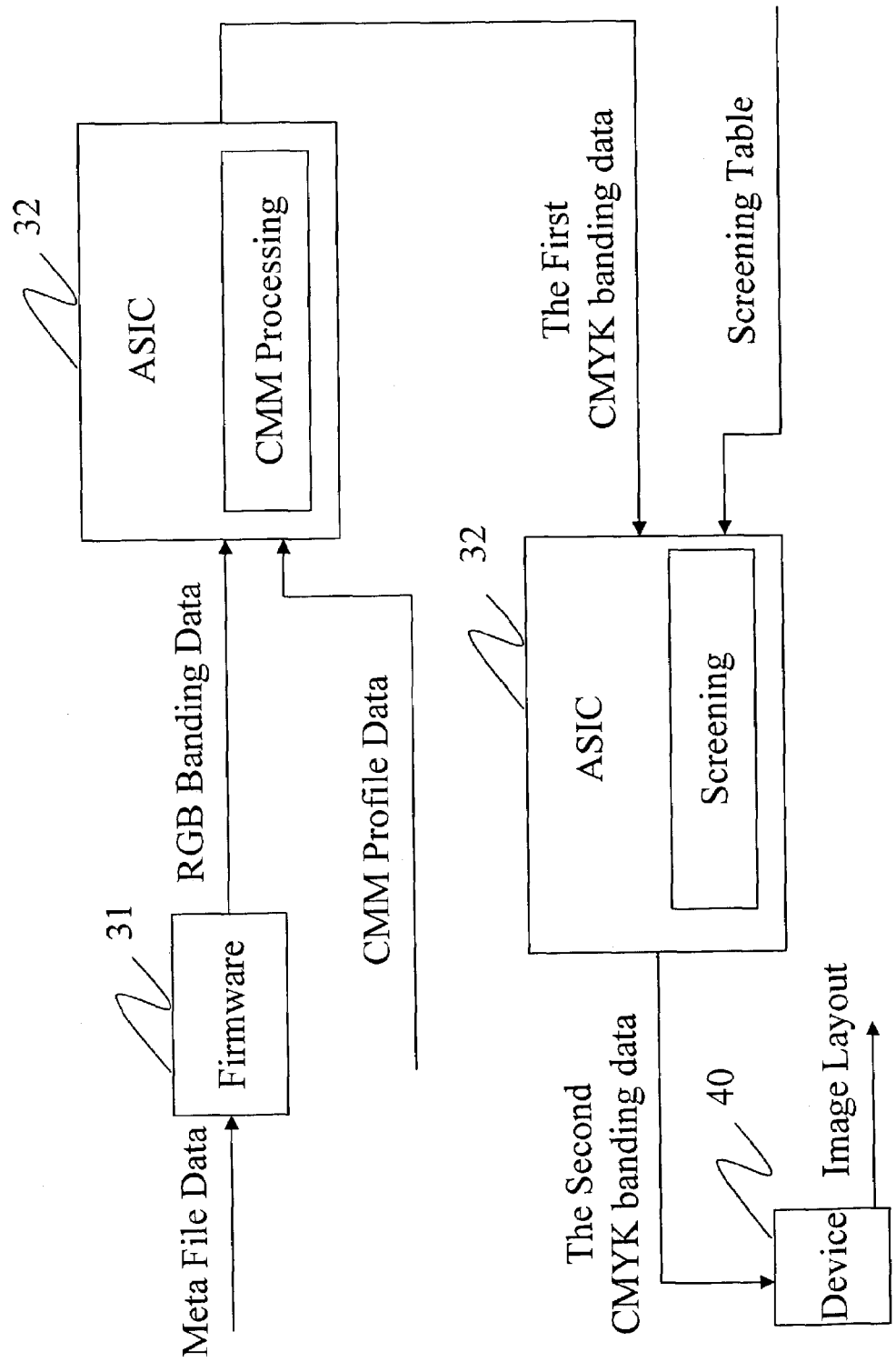
FIG. 4 is a diagram showing data processing performed for a CMM, according to the embodiment of the invention.

Referring to FIG. 3 and FIG. 4, the first step is—diving an object data into a Meta file data, a CMM profile data and a screening/half-toning table (step 100), which are processed by the firmware 31 or the specific application integrated circuit 32.

Then the second step is—processing the meta file data through a firmware to generate a RGB banding data (step 110).

And the third step is—processing the RGB banding data and the CMM profile data through an application specific integrated circuit to generate a first CMYK banding data (step 120). Specifically, the RGB and the CMM profile are subjected to a CMM processing in the ASIC to generate the first CMYK banding data. The first CMYK banding data is 8 bits.

processing the first CMYK banding data generated and the screening/half-toning table through the application specific integrated circuit to generate a second CMYK banding data for image layout (step 130). The first CMYK banding data, generated in the step 120 and the screening/half-toning table, are transmitted to the ASIC 32 and subjected to a screening process through the ASIC 32, to generate a second CMYK banding data for image layout. Specifically, the first CMYK data and the screening/half-toning table are subjected to a screening process in the specific application integrated circuit, to generate the second CMYK banding data. The second CMYK banding data can be 1 bit, 2 bits, 4 bits or 8 bits.

The second CMYK banding data are transmitted to an image layout device 40 such as a printer. Thereby, the data processing with the CMM according to the invention is accomplished.

Reading the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing method for a color management module (CMM), applying to image processing, comprising the steps of:
   dividing an object data of a digital image respectively into a meta file data, a CMM profile data and a screening/half-toning table;
   processing the meta file data through a firmware to generate a RGB banding data;
   processing the RGB banding data and the CMM profile data by an application specific integrated circuit to generate a first CMYK banding data;
   processing the first CMYK banding data and the screening/half-toning table by the application specific integrated circuit to generate a second CMYK banding data for the digital image layout; and
   printing the processed digital image.

2. The data processing method of claim 1, wherein at the step of generating the first CMYK data, the RGB banding data and the CMM profile data are subjected to a CMM processing in the application specific integrated circuit to generate the first CMYK banding data.

3. The data processing method of claim 1, wherein at the step of generating the second CMYK data, the first CMYK banding data and the screening/half-toning table are subjected to a screening process in the application specific integrated circuit to generate the second CMYK banding data.

4. The data processing method of claim 1, wherein the first CMYK banding data is 8 bits.

5. The data processing method of claim 1, wherein the second CIVIYK banding data is selected from the group consisting of 1 bit, 2 bits, 4 bits and 8 bits.

* * * * *